Feb. 3, 1942.     C. D. COULTER ET AL     2,271,761
PROCESS FOR TREATING HYDROCARBONS
Filed Dec. 17, 1938
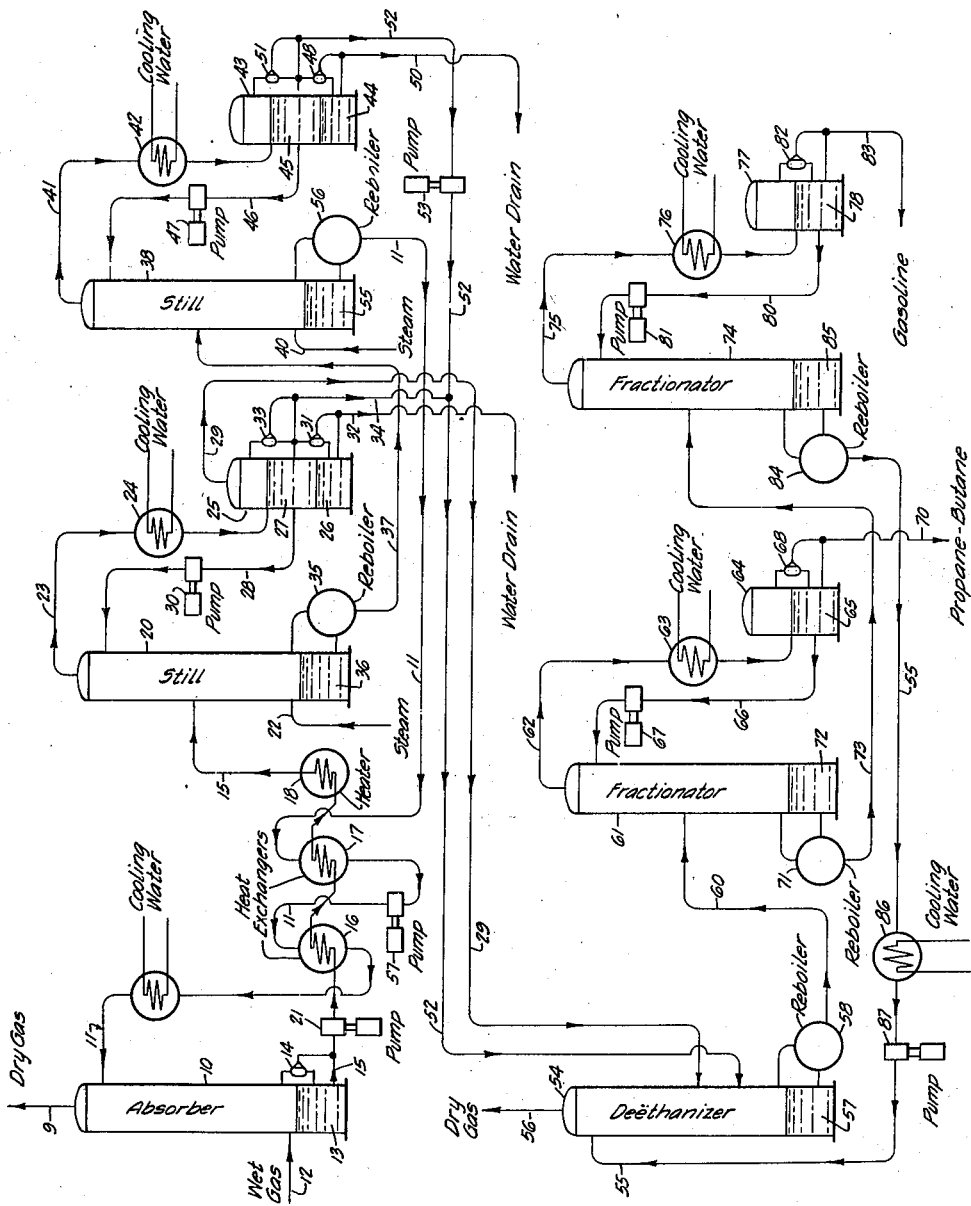
Inventors:
Clarence D. Coulter
Edwin R. Cox
By Russell M. Otis
Attorney.

Patented Feb. 3, 1942

2,271,761

UNITED STATES PATENT OFFICE 2,271,761

PROCESS FOR TREATING HYDROCARBONS

Clarence D. Coulter, Los Angeles, and Edwin R. Cox, Huntington Park, Calif., assignors to Southwestern Engineering Company, Los Angeles, Calif., a corporation of California Application December 17, 1938, Serial No. 246,352

2 Claims. (Cl. 196—8)

This invention relates to a process for treating hydrocarbons and particularly to the treatment of natural gas derived from oil and gas wells for the purpose of separating various of the constituents thereof.

It is a principal object of this invention to provide a process for treating hydrocarbon gas to separate it into a less valuable group and a more valuable group of constituents and to further treat the more valuable group to effect a further separation of the components thereof.

It is another object of this invention to provide a process for treating a mixture of hydrocarbons which have been obtained in a liquid form by an absorption process, or otherwise, to remove therefrom substantially all the methane and ethane which they may contain without substantial loss of propane or heavier constituents, and to effect this separation by a process more economical and effective than those commonly employed.

Another object of the invention is to provide a process for treating hydrocarbon gas in which the heavier constituents thereof are refluxed and employed as absorbent medium in the separation of methane and ethane from propane and heavier hydrocarbons.

Another object is to provide a process for producing from natural gas a clean, white gasoline.

Another object is to provide a process for producing from natural gas propane and butane which is substantially free from methane and ethane.

Another object is to provide apparatus for conducting a process whereby the foregoing results are achieved.

With the above and other objects in view, our invention consists in the steps of the process hereinafter described and claimed.

In the accompanying drawing we have shown a diagrammatic representation of an apparatus suitable for carrying out our process.

While our process is applicable to the treatment of hydrocarbon gases and vapors which may be derived from other sources than wells, it finds its greatest use in the treatment of gas which accompanies the production of oil or is derived from gas wells, and the process will be described as employed in treatment of such gases.

Referring to the drawing, the numeral 10 designates an absorption tower or absorber which may be of any of various types well known in the art. The absorber 10 has an inlet conduit 11 connected near the top thereof through which an absorbing medium, preferably oil similar to kerosene, is led into the absorber at a temperature preferably as low as can economically be obtained.

Through an inlet 12 into the lower end of the absorber 10 above the liquid level is led wet hydrocarbon gas which may, for example, come from a trap on an oil well. In the absorber 10 the wet gas mingles in intimate contact with the absorption oil and a portion of the hydrocarbons is absorbed in the absorbing oil and accumulates at the bottom of the absorber 10, forming rich oil 13. While most of the less valuable hydrocarbon constituents such as methane and ethane pass through the absorber 10 and out through the line 9 without being absorbed in the absorption oil, a certain proportion of the methane and ethane is inevitably absorbed along with the more valuable constituents. But the methane and ethane are undesirable in mixture with the other components because they cannot conveniently be retained with them in use. Our process is adapted to remove the absorbed methane and ethane without substantial loss of propane and the heavier and more valuable constituents.

In practice, in a typical case, the pressure at which the absorber 10 is maintained is about 38 lbs. per sq. in. The level of the rich oil 13 is maintained constant by a level control device 14 which acts to vary the amount of rich oil which passes out of the absorber through a line 15.

The line 15 carries the rich oil 13 containing the hydrocarbon gases in solution through heat exchangers 16 and 17 where it comes in heat exchange relation with the hot absorbing oil in line 11 going to the absorber 10. The rich oil then passes through a heater 18 and into a primary still 20, preferably at a point of medium elevation. If the pressures of the absorber 10 and the still 20 are such as to require it, a pump 21 may be inserted in the line 15 to force the rich oil into the still 20.

The primary still 20 may be of conventional construction, and is preferably provided with a conventional dehydrator. Distillation steam is brought into the still at 22 for the purpose of decreasing the vapor pressure of the components it is desired to vaporize. In the typical case, the pressure of the still 20 is maintained at about 160 lbs. per sq. in. In this still the rich oil entering through the line 15 is partially stripped of its lighter constituents, the overhead passing out through the line 23 and passing through the water-cooled condenser 24 wherein all but the lightest vapors carried by the line 23 are condensed. The condensate passes into a separator 25 in which the water separates from the hydrocarbon liquids and forms a water layer 26 at the bottom and a hydrocarbon liquid layer 27 above. A portion of the condensed hydrocarbon liquid 27 is refluxed through a line 28 which includes a pump 30 adapted to pump the liquid 27 back into the still 20. The level of the water layer 26 is maintained constant by a level control device 31 which acts by admitting more or less water to the water drain line 32. The level of the hydrocarbon liquid layer 27 is maintained constant by the level control device 33 which acts by admitting more or less of this condensate to a line 34 leading to a deethanizer 54 as hereinafter described in detail. The uncondensed vapors consisting largely of methane and ethane but containing heavier constituents pass by line 29 from the separator 25 into the deethanizer 54, as hereinafter explained. A reboiler 35, which may be of conventional construction, takes accumulated bottom liquid 36 from the still 20, heats, and returns a portion thereof to the still 20. Oil 36 passes also by the line 37 at a point of medium elevation into a secondary still 38.

The secondary still 38 may be of conventional construction, and has distillation steam entering through a line 40. In the typical case, the pressure therein is preferably maintained at about 45 lbs. per sq. in. In this still 38 the stripping of the oil is completed. The overhead from the still 38 passes out through the line 41 and is all condensed in the water-cooled condenser 42. The condensate passes into the separator 43 in which the contained water separates out to form a water layer 44 at the bottom and the gasoline fractions accumulate in a layer 45 above. A portion of the gasoline condensate 45 is refluxed through a line 46 which includes a pump 47 adapted to pump the gasoline back into the still 38. The level of the water layer 44 is maintained constant by the level control device 48 which acts to pass more or less water into the water drain line 50. The level of the gasoline layer 45 is maintained constant by a level control device 51 which acts to pass more or less of the gasoline into a line 52 including a pump 53 adapted to pump the condensed gasoline into the deethanizer 54. The line 34 from the separator 25 may join the line 52 leading to the deethanizer 54 at a point between the deethanizer and the pump 53. The bottom liquid 55 in the still 38, which consists substantially of only absorption oil from which all the absorbed hydrocarbons have been removed, is circulated through a reboiler 56, which may be of conventional construction, and returned to the still 38, a portion being removed and passing into the line 11 leading through the heat exchangers 17 and 16 into the absorber 10. A pump 57 is inserted in the line 11 to pump the absorbing oil 55 into the absorber 10. In passing through the heat exchangers 17 and 16, the hot oil 55 gives up a large portion of its heat to rich oil 13 going to the still 20 and is thereby cooled for more efficient absorption in the absorber 10.

It is advantageous at this point to consider briefly the operation of that part of the process described above. It will be observed that the absorption oil 55 circulates indefinitely through the absorber 10 and the two stills 20 and 38, its function being to absorb hydrocarbon gases and vapors in the absorber and conduct them to the primary still, and conduct the residue of the primary still to the secondary still where all but the absorption oil is removed. The pressure in the still 20 is preferably maintained at a value suitable for removing methane and ethane from the absorption oil to the extent that the very small amount of methane and ethane passing into the secondary still 38 and being vaporized therein is absorbed by the gasoline fractions and can pass to the deethanizer in liquid form. Preferably the pressure in the primary still is made suitable for removing substantially all of the methane and ethane and is maintained at a value greater than that in the deethanizer 54 in order to permit the uncondensed gases liberated in the still 20 to pass by reason of the pressure differential through the line 29 into the deethanizer 54 without requiring any recompressor. In order to strip off substantially all methane and ethane in the still 20, however, it is necessary to operate the still 20 at such a high pressure that it is impossible to completely strip the oil of all gasoline fractions; so the secondary still 38 is employed in which all gasoline fractions are completely stripped, and since the non-condensible fractions have substantially all been removed in the still 20, all of the overhead from the secondary still is readily condensed and can be pumped by means of a liquid pump to the deethanizer. Thus, the methane and ethane which are removed from the absorption oil pass naturally into the deethanizer 54 and the liquified fractions which are removed can easily be pumped into the deethanizer.

While the uncondensed gas passing through the line 29 may be mostly methane and ethane, it contains so much propane and other valuable constituents that it is desirable to make a cleaner separation between the methane and ethane, and the propane. This is done in the deethanizer 54. The deethanizer 54 is constructed similarly to a fractionator of conventional construction. In the present instance the lower portion of the deethanizer 54 acts as a stripper to strip off methane and ethane and the upper portion acts as an absorber to absorb propane and heavier fractions. The line 29 conducting the uncondensed gases from the separator 25, and the line 52 conducting the gasoline fractions from both of separators 25 and 43, enter the deethanizer 54 at points of medium elevation. A refluxed absorbent medium, preferably having a mean molar boiling point and vapor pressure near those of octane, enters the deethanizer 54 near the top thereof through a line 55. The pressure of the deethanizer 54 is maintained at a value lower than the pressure of the primary still 20, but at a value suitable for the clean separation of methane and ethane from propane. In the typical case, the pressure of the deethanizer 54 is preferably about 150 lbs. per sq. in. The methane and ethane pass out the top of the deethanizer 54 through a line 56, and the propane, butane and heavier gasoline fractions together with the absorbent medium accumulate at 57 in the bottom. A reboiler 58 circulates and heats the bottom material 57, which passes through a line 60 into a fractionator 61 at a point of medium elevation.

The pressure of fractionator 61 is maintained at a value suitable for the removal of propane and butane, in the typical case, this pressure being between 100 and 140 lbs. per sq. in. The propane and butane pass out of the fractionator 61 by the overhead line 62, are condensed in a water-cooled condenser 63 and led to an accumulator 64 where it forms a body of liquid 65. A portion of the condensate 65 is refluxed through a line 66 leading into the top of the fractionator 61, and including a pump 67 adapted to pump the liquid into the fractionator. A level control device 68 is adapted to maintain the level of the liquid 65 constant by acting to pass more or less of the propane and butane out of a line 70. A reboiler 71 circulates and heats the bottom material 72 in the fractionator 61, and the bottom material 72 passes through a line 73 into a fractionator 74 at a point of medium elevation.

The pressure of the fractionator 74 is maintained at a value suitable for stripping off all but the absorbent material required for reflux for the deethanizer 54. A typical pressure is about 12 lbs. per sq. in. The overhead passes out through a line 75, is condensed in a water-cooled condenser 76, and passes to an accumulator 77 where it forms a body of liquid 78. A portion of the liquid 78 is refluxed to the fractionator 74 through a line 80 including a pump 81 adapted to pump the liquid 78 into the fractionator 74. A level control device 82 is adapted to maintain constant the level of the liquid 78 by acting to pass more or less of the liquid out through a line 83. The liquid discharging from the line 83 constitutes the gasoline production of the plant. A reboiler 84 circulates and heats the bottom liquid 85 in the fractionator 74, and the liquid 85 passes into the line 55 leading to the deethanizer 54. A water-cooled cooler 86 is installed in the line to cool the liquid 85, which may be at 300° F. in the fractionator 74, to a temperature, in a typical case, of about 90° F. when it enters the deethanizer 54. A pump 87 is installed in the line 55 and is adapted to pump the refluxed absorbent medium into the deethanizer 54.

The absorbent medium 85 circulates indefinitely around its circuit, absorbing propane and heavier constituents in the deethanizer 54, conducting them to the fractionator 61, and conducting the gasoline fractions to the fractionator 74. This liquid must be capable of readily absorbing propane in order to effect a clean separation of the methane and ethane from propane in the deethanizer 54. If ordinary absorption oil is used for this absorbent medium it would tend to color the gasoline that is produced through line 83 unless special provision is made to prevent it. The absorbent medium 85 preferably has a mean molar boiling point and vapor pressure about equal to those of octane. This liquid may be added to the circuit from some outside source but preferably consists of hydrocarbon constituents present in the hydrocarbons being treated and heavier than the gasoline which is produced. The absorbent medium is, therefore, preferably produced in the process at a rate just sufficient to make up for the small loss attendant upon production of the various separated constituents. Thus, the pressure in the last fractionator 74 is maintained at such a value as to maintain approximately a constant quantity and composition of absorbent medium 85 in the system. An important advantage of this process is that steam distillation is not required to effect separation of the gasoline from the absorbent medium in the fractionator 74. Another advantage is that this absorbent medium, similar to octane, has a substantial vapor pressure at the bottom of the deethanizer 54 and therefore does not require an excessively high temperature in the deethanizer 54 to strip off all the methane and ethane.

It is evident that our process permits the clean separation and separate production of methane and ethane; propane and butane; and natural gasoline from the absorbed hydrocarbons. It is also evident that our process is continuous and self-maintaining, and that the absorption oil carrying the various incoming hydrocarbons is completely stripped and all the overhead may be passed to the deethanizing apparatus without the use of a recompressor with its attendant disadvantages.

It will be understood that the process may be operated to separate the various incoming hydrocarbons along different lines and to produce different groups of hydrocarbons from those herein described, and that the temperatures and pressures herein given are for illustrative purposes only. It will be understood that those skilled in the art may vary and modify the apparatus, the process, and the conditions herein disclosed without departing from the spirit and scope of the appended claims.

We claim as our invention:

1. A continuous process for treating hydrocarbon gas which includes: absorbing said gas in an absorption oil to form a rich oil; stripping the absorbed hydrocarbon gas from said rich oil by multiple stage distillation; returning the residual absorption oil to the process at the point of absorption of said hydrocarbon gas; fractionating off and removing substantially all of the methane and ethane and absorbing in an absorbent medium substantially all of the propane and heavier hydrocarbons contained in the hydrocarbons stripped from said rich oil, said absorbent medium being substantially free from propane and butane and consisting of gasoline constituents present in the hydrocarbon gas being treated; the pressure at which the methane and ethane is stripped from the rich oil being greater than the pressure at which said fractionation and said absorption in the absorbent medium take place; fractionally distilling and removing from the rich absorbent medium hydrocarbon constituents including substantially all the contained propane and butane; and returning the residual absorbent medium to the process at the point of absorption of propane and heavier constituents; the quantity and character of said hydrocarbon constituents removed from said rich absorbent medium being such as to maintain the composition and quantity of the absorbent medium in the process substantially constant.

2. A process for treating hydrocarbons which includes: absorbing said hydrocarbons in an absorption oil to form a rich oil; partially distilling said rich oil in a primary distillation step; substantially completely stripping the residual rich oil of all its absorbed hydrocarbons in a secondary distillation step, leaving absorption oil as residue; returning said residual absorption oil to the process at the point of absorption of said hydrocarbons; condensing the hydrocarbons vaporized in said secondary distillation step; said primary distillation step being conducted at such a pressure as to result in vaporization of so great a portion of the contained methane and ethane that the remaining methane and ethane vaporized in said secondary distillation step is substantially all absorbed by the condensate from said secondary distillation; fractionating off and removing substantially all of the methane and ethane contained in the condensate from said secondary distillation step and in the hydrocarbons vaporized in said primary distillation step and absorbing in an absorbent medium substantially all of the propane and heavier hydrocarbons, said fractionating and absorption being conducted at a pressure lower than the pressure at which said primary distillation is conducted, and said absorbent medium consisting of constituents present in the hydrocarbons being treated and having a mean molar boiling point approximately equal to that of octane; fractionally distilling and removing from the rich absorbent medium propane and butane, and gasoline, leaving as residue said absorbent medium; and returning said absorbent medium to the process at the point of absorption of propane and heavier constituents.

CLARENCE D. COULTER.
EDWIN R. COX.